United States Patent [19]

Langdon et al.

[11] 4,183,821

[45] Jan. 15, 1980

[54] HETERIC/BLOCK POLYOXYALKYLENE COMPOUNDS AS CRUDE OIL DEMULSIFIERS

[75] Inventors: William K. Langdon, Grosse Ile; Ronald L. Camp, Riverview, both of Mich.

[73] Assignee: BASF Wyandotte Corporation, Wyandotte, Mich.

[21] Appl. No.: 909,744

[22] Filed: May 26, 1978

[51] Int. Cl.$^2$ .................... C10M 1/20; B01D 17/04; C07C 43/00; C07C 43/04

[52] U.S. Cl. .................. 252/331; 252/52 A; 568/608; 568/624; 568/625; 568/617

[58] Field of Search ............... 252/52 A, 52 R, 331; 260/615 B; 568/624, 625

[56] References Cited

U.S. PATENT DOCUMENTS

| | | | |
|---|---|---|---|
| 2,991,269 | 7/1961 | Nozaki | 260/45.5 |
| 3,194,772 | 7/1965 | Trotz | 260/2 |
| 3,425,999 | 2/1969 | Axeirood et al. | 260/77.5 |
| 3,557,017 | 1/1971 | Mange et al. | 252/331 X |
| 3,577,559 | 5/1971 | Horsley | 260/410.6 |
| 3,644,567 | 2/1972 | Smith et al. | 260/829 |
| 3,816,279 | 6/1974 | Schlesinger | 204/159.11 |
| 4,038,296 | 7/1977 | Grelf et al. | 260/410.6 |

OTHER PUBLICATIONS

Kuwamura et al., J. of the American Oil Chemists Society 48, pp. 29–34 (1971).

Primary Examiner—W. J. Shine
Attorney, Agent, or Firm—Andrew E. Pierce

[57] ABSTRACT

There are disclosed polyoxyalkylene compound demulsifying agents derived from tetrahydrofuran and $C_2$–$C_4$ vicinal alkylene oxides which are heteric/block copolymers; a process for the preparation of said polyoxyalkylene compounds; a demulsified petroleum crude oil; and a batch or continuous process for the demulsification of crude petroleum oil.

17 Claims, No Drawings

HETERIC/BLOCK POLYOXYALKYLENE COMPOUNDS AS CRUDE OIL DEMULSIFIERS

BACKGROUND OF THE INVENTION

1. Field of the Invention

This invention relates to the demulsification of crude petroleum oil.

2. Description of the Prior Art

In the production of crude petroleum oil, the use of a demulsifying agent to separate water from the crude petroleum is often necessary especially where the petroleum producing strata has been acidized by an operation involving forcing corrosion inhibited acid down the oil well and into the petroleum producing strata formation. The acid attacks limestone formations enlarging the fissures and openings through which the oil fluids flow to the well pool, thus increasing the production of oil. Subsequently, the crude petroleum oil is obtained from the well pool in admixture with various amounts of water which form with the crude petroleum oil, in many cases, particularly troublesome emulsions which are often extremely stable and will not resolve on long standing. In addition, as will be understood, water-in-oil emulsions can occur as the result of various operations encountered during the processing of crude or refined petroleum oil.

Polyoxyalkylene compounds are known for use in demulsification of water-in-oil mixtures, for instance, surface active polyoxypropylene esters are disclosed in U.S. Pat. No. 2,950,313 as useful in the separation of water and crude oil mixtures. In addition, polyglycidyl polymers have been suggested as demulsifiers for emulsions of mineral oil such as crude petroleum oil in combination with either soft water or weak brines.

It is known to prepare polyoxyalkylene compounds utilizing tetrahydrofuran in combination with $C_2-C_3$ alkylene oxides. For instance, U.S. Pat. No. 3,425,999 relates to the preparation of polyether polyols prepared by reacting ethylene oxide and tetrahydrofuran to produce heteric polyethers and in the *Journal of the American Oil Chemists Society* 48, 29, kuwamura et al disclose the preparation of block copolymers of tetrahydrofuran and ethylene oxide for use as surfactants. In U.S. Pat. No. 3,644,567, there is disclosed that block polymers prepared by capping a polytetrahydrofuran polymer with ethylene oxide are useful alkylating and acylating agents. Further, in U.S. Pat. No. 4,038,296, there is disclosed the preparation of tetrahydrofuran based copolymers which are heteric adducts of ethylene oxide or propylene oxide and tetrahydrofuran or block polymers of ethylene oxide or propylene oxide reacted with a mixture of ethylene oxide or propylene oxide and tetrahydrofuran. However, the polyoxyalkylene compounds of the invention and their use as crude petroleum oil demulsifiers are neither disclosed nor suggested in the prior art.

SUMMARY OF THE INVENTION

It is a primary object of this invention to provide to the art polyoxyalkylene compounds and a process for the preparation thereof, said compounds being particularly suited for the demulsification of crude petroleum oil. Accordingly, there are disclosed polyoxyalkylene compounds of the formula:

$$Y[(A)_m(B)_nH]_x$$

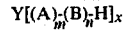

wherein Y is the residue formed by the removal of x atoms of active hydrogen from an initiator having a total of not more than 20 carbon atoms and free of elements other than carbon, hydrogen and oxygen, said initiator preferably being selected from the group consisting of water, alkylene glycols, polyalkylene glycols, alkanols, phenols, and alkyl phenols; A is a hydrophobic, heteric mixture of an oxytetramethylene radical, derived from tetramethylene oxide and at least one of a vicinal alkylene oxide radical derived from ethylene oxide, propylene oxide, and butylene oxide ($C_2-C_4$), said A being derived from the reaction of said oxides in the molar ratio of tetramethylene oxide:vicinal alkylene oxide of 3:1 to 1:1; B is $C_2$ or mixture of $C_2$ and $C_3-C_4$ oxyalkylene radicals derived from ethylene oxide, 1,2-propylene oxide, and vicinal butylene oxide, provided said $C_3-C_4$ oxyalkylene radicals are present in a proportion of not more than 50 percent by weight of the total weight of said ethylene oxide; x is an integer of one to about five; m is an integer such that the total weight of said A is about 90 to about 10 percent by weight of the total oxyalkylene residue weight of the compound; n is an integer such that the total weight of said B is about 10 to about 90 percent by weight of the total oxyalkylene residue weight of the compound; the total molecular weight of the hydrophobe, m x, is about 900 to about 10,000; and the total molecular weight of said polyoxyalkylene compound, is about 1000 to about 20,000, preferably about 1000 to about 16,000.

In addition, a novel two stage process for the preparation of the heteric/block polyoxyalkylene compound crude petroleum oil demulsifiers is disclosed comprising the preparation in stage one of a heteric polyoxyalkylene hydrophobe by polymerization of tetrahydrofuran and at least one $C_2-C_4$ vicinal alkylene oxide by polymerization in the presence of an initiator and a Lewis acid catalyst and the subsequent capping in stage two of said hydrophobe utilizing ethylene oxide or a mixture of ethylene oxide and at least one $C_3-C_4$ vicinal alkylene oxide provided that said $C_3-C_4$ alkylene oxide is present in the proportion of not more than 50 percent by weight of the ethylene oxide utilized for capping. The capping process is conducted in the presence of a conventional base catalyst, for instance, an alkaline earth metal or an alkali metal or the oxide, hydroxide or alkoxide thereof. A demulsified petroleum oil and a process for the preparation of a demulsified petroleum oil are also disclosed.

DETAILED DESCRIPTION OF THE INVENTION AND OF PREFERRED EMBODIMENTS

As is well known in the prior art, polyether compounds can be produced by first reacting an initiator compound designated as Y in the formula above, said initiator having one to five active hydrogen atoms. By use of the term "active hydrogen atoms" it is intended to describe any compound which gives a positive Zerewitinoff test. The term active hydrogen atom is well known and clearly understood by those skilled in the art. However, to remove any possible ambiguity in this regard, the term active hydrogen atom, as used herein and in the appended claims, includes any hydrogen atom fulfilling the following two conditions:

1. It is sufficiently labile to open the epoxide ring of 1,2-propylene oxide, and
2. It reacts with methyl magnesium iodide to liberate methane in the classical Zerewitinoff reaction (see Niederl and Niederl, Micromethods of Quantitative Organic Analysis, p. 263, John Wiley and Sons, New York city, 1946).

Representative examples of the broad classes of the preferred initiators are the monohydric alcohols such as phenol, cresol, butanol, 2-ethylhexanol, ethanol, and methanol; the polyhydric alcohols such as hydroquinone, ethylene glycol, butylene glycol, glycerol, diethylene glycol and trimethylolpropane. A wide variety of suitable initiators and general procedures for making polyethers are illustrated, for instance, in U.S. Pat. Nos. 2,674,619 and 2,677,700, incorporated herein by reference.

In utilizing the procedures contained therein for the preparation of polyethers, the 1,2-propylene oxide used therein is replaced with tetramethylene oxide in making the heteric portion of the heteric/block polymers of the invention. Preferably, the useful initiators are those having up to three active hydrogen atoms and one to about eight carbon atoms.

The polyether compounds of the invention generally contain in the hydrophobic, heteric vicinal alkylene oxide-tetramethylene oxide residue weight a total of about 90 to about 10 percent by weight of the total oxyalkylene residue weight of the compound and preferably about 85 to about 25 percent by weight. The heteric portion of the copolymer contains a random mixture of tetramethylene oxide and $C_2$–$C_4$ vicinal alkylene oxides, preferably a random mixture of ethylene oxide and tetramethylene oxide. Said heteric copolymer is derived from the reaction of said oxides in the molar ratio of about 3:1 to about 1:1 and thus said copolymer has the oxide residues in the copolymer in said ratio. In the preparation of said heteric copolymers, charged ratios of the oxides are respectively about 8:1 to about 1:1 of the tetramethylene oxide:vicinal alkylene oxides. The proportion of ethylene oxide or ethylene oxide and $C_3$–$C_4$ vicinal alkylene oxide residue in the hydrophilic cap can vary to the extent required to maintain the desired hydrophilic properties of the crude petroleum oil dumulsifiers of the invention; provided the proportion of $C_3$–$C_4$ vicinal alkylene oxide residues does not exceed 50 percent by weight of the total weight of ethylene oxide residue in the hydrophilic cap. Preferably said cap is the residue of ethylene oxide. Most preferably the demulsifier compounds of the invention are polyoxyalkylene compounds having the formula:

$$Y[-(A)_m(C_2H_4O)_nH]_x$$

wherein Y, m, n, and x have the same values as previously defined and wherein A is a hydrophobic, heteric mixture of oxyethylene and oxytetramethylene residues derived from the reaction of ethylene oxide and tetramethylene oxide having the ratio by weight of 2:1.

The proportion of hydrophilic cap in the compound can also vary somewhat depending upon the molecular weight of the hydrophobic, heteric polytetramethylene oxide-$C_2$–$C_4$ vicinal alkylene oxide copolymer. Generally the total weight of ethylene oxide or ethylene oxide and $C_3$–$C_4$ vicinal alkylene oxide residue in the cap is about 10 to about 90 percent by weight, preferably about 15 to about 75 percent by weight based upon the total oxyalkylene weight in the compound. Generally the molecular weight of said heteric copolymer hydrophobe is about 900 to about 10,000, it being found that the polyoxyalkylene compounds of the invention are more effective demulsifiers as the molecular weight of the hydrophobe is increased to the above upper limit.

The total molecular weight of the compound is preferably about 1000 to about 16,000. However, polyoxyalkylene compounds of the invention, in comparison with those prepared by substituting 1,2-propylene oxide for tetrahydrofuran in the hydrophobe, and containing a molecular weight of about 900 to about 10,000 in the heteric copolymer hydrophobe, require a smaller proportion of the residue of ethylene oxide or mixed ethylene oxide and $C_3$–$C_4$ vicinal alkylene oxides in the cap.

Generally, the copolymers of the invention are prepared by first preparing the heteric portion of the polymer by reacting in a first stage a mixture of tetrahydrofuran and at least one $C_2$–$C_4$ vicinal alkylene oxide with a monohydric or polyhydric alcohol in the presence of a Lewis acid catalyst and then reacting the heteric polyoxyalkylene product obtained in a second stage with ethylene oxide or a mixture of ethylene oxide and at least one of a vicinal butylene oxide and 1,2-propylene oxide using the well-known method of base catalysis, as disclosed in U.S. Pat. Nos. 2,674,619 and 2,677,700. As is well known to those skilled in the art, a Lewis acid is defined as any molecule or ion that can combine with another molecule or ion by forming a covalent bond with two electrons from the second molecule or ion. A Lewis acid is thus an electron acceptor. Many compounds in addition to the hydrogen ion exhibit this behavior, for instance boron trifluroide, stannic chloride, and aluminum chloride. The base catalysis reaction of ethylene oxide or a mixture of $C_2$ with $C_3$–$C_4$ vicinal alkylene oxides with the heteric copolymer can use suitable base catalysts including the alkaline earth and alkali metals, alkoxides, oxides and hydroxides thereof. Representative examples include sodium, potassium, lithium, and magnesium metals, and oxides and hydroxides thereof. Preferred alkali metal hydroxides are sodium hydroxide, lithium hydroxide, and potassium hydroxide. Further details of the preparation of the heteric portion of the copolymers of the invention can be found in Japanese patent 213-1977 to Tanizaki et al., incorporated herein by reference.

The molecular weight of the oxyethylene capped tetrahydrofuran-ethylene oxide polyether heteric copolymer lubricants of the invention can be calculated from the hydroxyl number in accordance with the formula:

$$\text{Molecular weight} = \frac{56.1 \times 1,000 \times \text{number of hydroxyl groups}}{\text{hydroxyl number}}$$

The hydroxyl number of the polyether can be calculated as described in ASTM D-1638.

The molecular weight of the final demulsifier can vary widely, depending upon various factors, for example the particular $C_2$–$C_4$ vicinal alkylene oxide utilized in conbination with tetrahydrofuran in the preparation of the heteric, hydrophobic portion of the polymer. The hydrophobic portion of the copolymer is suitably balanced by capping with a hydrophilic ethylene oxide cap or a mixture of ethylene oxide and at least one $C_3$–$C_4$ vicinal alkylene oxide. Therefore, the total molecular weight of the hydrophobe can vary from about 900 to about 10,000 and higher and accordingly, the total molecular weight of the demulsifier compound can vary from about 1000 to about 20,000, preferably about 1000 to about 16,000 and most preferably from about 1000 to about 12,000.

The demulsifier compositions of the invention have unexpected utility in preventing, breaking or resolving emulsions of the water-in-oil type and particularly crude petroleum oil emulsions containing about five to about 75 percent water. Use of the demulsifiers of the invention provide an economical and rapid process for resolving crude petroleum oil emulsions which are commonly referred to in the art as "cut oil," "roily oil," "emulsified oil," etc. These emulsions comprise droplets of naturally-occurring waters or brines dispersed in a more or less permanent state throughout the oil which constitues the continuous phase of the emulsion. The use of the demulsifiers of the invention is not limited to crude petroleum oil emulsions but extends to the breaking of hydrocarbon emulsions derived from refined mineral oil, gasoline, kerosene, etc. Their use provides a method which is also of significant value in removing watersoluble impurities such as dissolved inorganic salts from hydrocarbon based compositions, particularly in processes for the desalting of crude petroleum oil.

The process of demulsification in accordance with the present invention also includes the preventive step of mixing the demulsifier with an aqueous component which can, at some future time, come in contact with a hydrocarbon phase and which, in the absence of such demulsifier in the aqueous component, would form an emulsion with said hydrocarbon component. This meaning is in addition to the usual meaning for the word demulsification wherein an aqueous phase and a hydrocarbon oil phase exist in a co-mingled state of emulsification and the demulsifiers of the invention are added thereto to separate the phases into two layers as an initial step in the purification of the crude petroleum oil.

Where the demulsifiers of the invention are employed in the treatment of oil field emulsions, they can be added to such emulsions with or without dilution utilizing a suitable solvent such as water, aliphatic alcohols, petroleum hydrocarbons and mixtures thereof. Useful hydrocarbon solvents are benzene, toluene, xylene, tar acid oil, cresol, anthracene oil, etc. The useful aliphatic alcohols are the $C_1$-$C_8$ aliphatic alcohols. Particularly useful aliphatic alcohols are methyl alcohol, ethyl alcohol, propyl alcohol, butyl alcohol, hexyl alcohol, and octyl alcohol. Various miscellaneous solvents can be used as diluents, for example, pine oil, and carbon tetrachloride. While the demulsifiers of the invention as single active component demulsifiers are particularly desirable in the demulsification of crude petroleum oil, it is contemplated that for this application as well as the demulsification of other hydrocarbon based fluids that the demulsifiers of the invention can be used in admixture with other suitable well-known classes of demulsifying agents which can be used in their water-soluble form or in their oil-soluble form, or in a form exhibiting both oil and water-solubility.

In the process of resolving crude petroleum oil emulsions of the water-in-oil type, the demulsifying agent of the invention is brought into contact with or caused to act upon the emulsion to be treated in any of the various methods now generally used in the petroleum industry to resolve or break crude petroleum oil emulsions with a chemical agent. The demulsifiers are frequently used in combination with crude petroleum oil in a weight ratio of 1:5,000 to 1:50,000, preferably about 1:10,000 to about 1:30,000 parts by volume of demulsifier:crude petroleum oil. At these concentrations, the relatively limited oil-solubility of the demulsifying agents of the invention would not prevent their use as demulsifiers.

The demulsifiers of the invention can be used in both batch and continuous processes for demulsification of crude petroleum oil. In a batch treatment process, generally a volume of emulsified oil in a tank is admixed with demulsifier by suitable agitation. Heating the crude oil emulsion, the demulsifier or the crude oil-demulsifier mixture can improve the dispersion of the demulsifier in the crude petroleum oil. Generally, said mixture is heated to a temperature of about 100° F. to 170° F., preferably about 130° F. to 140° F. Adequate dispersion of the demulsifier in the crude petroleum oil can also be accomplished by use of a circulating pump which withdraws a portion of the crude petroleum oil emulsion from the tank and reintroduces it, for instance, into the top of the tank. In this procedure the demulsifier of the invention can be added at the suction side of the circulating pump.

Introduction of the demulsifier of the invention into the crude petroleum oil well field at the well-head or at a point between the well-head and the final oil storage tank also provides a means of incorporating the demulsifier of the invention into crude petroleum oil so as to effect separation of emulsified crude petroleum oil into layers of oil and water. Once separation into distinct layers of water and crude petroleum oil has been effected, various means can be utilized for withdrawing the free water and separating the purified crude petroleum oil. Use of the demulsifiers of the invention beneath the surface in the oil well itself, either continuously or periodically in either diluted or undiluted form, can be accomplished in order to effect dispersion of the demulsifier of the invention so that upon obtaining the crude petroleum oil emulsion at the surface the emulsion can be treated to effect separation without the additional step of incorporating the demulsifier subsequent to the withdrawal of the crude petroleum oil from the well. As can be seen, the broad process of demulsification contemplated herein consists of incorporation of the demulsifier of the invention into an emulsion of crude petroleum oil or other hydrocarbon, allowing the emulsion to stand in a quiescent state until the desired separation into distinct layers of water and oil results. Generally, the time for separation or stratification of the layers of water and oil is about 5 minutes to about 50 minutes, preferably about 10 minutes to about 30 minutes. Subsequently, the desired purified crude petroleum oil or other hydrocarbon is separated from the mixture.

A typical process for demulsification of crude oil is as follows: A reservoir is provided to hold the demulsifier of the invention in either diluted or undiluted form adjacent to the point where the effluent crude petroleum oil leaves the well. For convenience the reservoir is connected to a proportioning pump capable of drop wise injecting the demulsifier of the invention into the fluids leaving the well which then pass through a flow line into a settling tank. Generally, the well fluids pass into the settling tank at the bottom of the tank so that incoming fluids do not disturb stratification of the layers of crude petroleum oil and water which takes place during the course of demulsification. Demulsification is started by setting the proportioning pump to feed a comparatively large volume ratio of demulsifier for instance, 1:5,000, demulsifier:crude petroleum oil, and this proportion is decreased subsequent to satisfactory demulsification of the crude petroleum oil emulsion so that a just sufficient amount of demulsifier is utilized such as amounts by volume of one part demulsifier to 10,000 to 50,000 parts of crude petroleum oil.

The following examples illustrate the various aspects of the invention. When not otherwise specified throughout this specification and claims, temperatures are given in degrees centigrade and parts, percentages and proportions are by weight.

EXAMPLE 1

The demulsifier compositions of the invention are prepared in two stages. First, the heteric copolymer of tetrahydrofuran and ethylene oxide or a mixture of ethylene oxide and at least one $C_3$–$C_4$ vicinal alkylene oxide with tetrahydrofuran is prepared by reaction in the presence of a Lewis acid catalyst. The general procedure for the preparation of the heteric copolymer is as follows: To a round bottom flask equipped with stirrer, thermometer, and dry ice condenser which has been flushed with nitrogen, there is added the initiator, tetrahydrofuran and boron trifluoride etherate catalyst. The catalyst concentration used is generally 1.5 mole percent of the hydroxyl source initiator. Wher high molecular weight products are made, a solvent such as methylene chloride can be added to retain a fluid reaction product mixture. Ethylene oxide is added to the reaction mixture for convenience by the vapor addition method. In this method, the ethylene oxide is vaporized and added to the dry ice condenser where it is allowed to condense and drop into the reaction flask. Ethylene oxide, for instance, is added at a reaction temperature of from between 35° to 40° C. When the addition of the alkylene oxides is complete, the reaction is stirred for two hours to allow reaction to take place. The reaction is stopped by the addition of sodium bicarbonate and the product obtained is filtered to remove the bicarbonate residue and stripped under vacuum to remove unreacted starting materials or solvent. In the second stage, an ethylene oxide cap or mixed $C_2$–$C_4$ vicinal alkylene oxide cap is added to the above-obtained heteric copolymer by reacting said $C_2$–$C_4$ alkylene oxides or ethylene oxide alone with the heteric copolymer in the presence of a base catalyst such as potassium hydroxide.

A tetrahydrofuran-ethylene oxide heteric copolymer was prepared using ethylene glycol as an initiator in accordance with the general procedure described above and using the following detailed procedure. To a one liter four necked flask there were charged 459 grams of tetrahydrofuran, 18.6 grams of ethylene glycol and 3.8 grams of boron trifluoride etherate. Over a 65 minute period, 141 grams of ethylene oxide were added to the reaction mixture at a temperature of 35° to 45° C. The reaction mixture was stirred an additional 45 minutes at 50° C. and then 5 grams of sodium bicarbonate were added to the mixture and stirring continued for 15 minutes. The product was then vacuum stripped up to a temperature of 122° C. at 3 millimeters of mercury pressure. The recovered volatiles in the amount of 170.5 grams were characterized as essentially tetrahydrofuran. The heteric copolymer product obtained in the amount of 454 grams was a clear liquid.

Utilizing the heteric copolymer prepared above, 400 grams of this product were combined with 2.2 grams of a 45 percent aqueous potassium hydroxide solution and 100 grams of ethylene oxide and reacted in an autoclave in accordance with the following procedure. The heteric copolymer and potassium hydroxide were charged to the autoclave and the autoclave was purged with nitrogen and pressure tested. The autoclave was then evacuated to less than 10 millimeters of mercury while heating to 110° C. to remove water. Nitrogen pressure was then released to five pounds per square inch gauge and the autoclave contents were heated to 135° C. and the autoclave pressurized with nitrogen to 34 pounds per square inch gauge. The ethylene oxide was then added over a period of one and one-half hours at a temperature of 135° to 138° C. at a pressure of 34 to 90 pounds per square inch gauge and the contents stirred continuously. After all the ethylene oxide had been added, stirring was continued for one hour and then the contents were cooled and discharged from the autoclave. The hydroxyl number of the product was 64.4, which corresponds to a molecular weight of 1742. The product had a cloud point of 22 to 33 degrees centigrade (one percent solids by weight in water), a surface tension of 42.4 dynes per centimeter and a Draves sink time of 207 seconds at 0.1 percent concentration.

EXAMPLE 2

Following the same procedure as disclosed in Example 1, a tetrahydrofuran-ethylene oxide heteric copolymer was prepared using ethylene glycol as an initiator. There was reacted 2,307 grams of tetrahydrofuran, 39 grams of ethylene glycol initiator, and 15.7 grams of boron trifluoride etherate with 356 grams of ethylene oxide. There was obtained a product in the amount of 1743 grams; the weight of tetrahydrofuran recovered by stripping was 991 grams. The product was characterized as a clear liquid having a hydroxyl number of 44 which corresponds to a molecular weight of 2550.

To an autoclave there was added 500 grams of the heteric copolymer prepared above, 2.8 grams of a 35 percent aqueous potassium hydroxide solution, and 167 grams of ethylene oxide and the product reacted in accordance with the autoclave procedure of Example 1. The product obtained was a clear liquid in the amount of 651 grams. The product had a cloud point of 51° C. (one percent solution in water), a Draves wetting time (0.1 percent concentration in water) of 463 seconds, and a surface tension of 42.3 dynes per centimeter.

EXAMPLES 3–5 (comparative examples)

These examples identify, respectively, commercially available crude petroleum oil demulsifiers sold under the trademarks CONROL 110 and CONROL 470 by the Conro Chemical Company, and VISCO 454 by the Visco Division of the Nalco Chemical Company.

The performance of the demulsifiers of the invention in separating the emulsified crude petroleum oil into water and oil layers was evaluated in the laboratory by admixing the crude oil with a 50 percent active demulsifier mixture (by volume) in equal volumes of xylene and methanol. Subsequent to admixture of the demulsifiers and oil in a 100 milliliter bottle, the mixture was shaken by hand to insure adequate dispersion of the demulsifier and then the sample was heated to 130°–140° F. and allowed to stand in a quiescent state for 20–30 minutes. The separated aqueous layer was removed and the amount removed was determined. The oil layer was observed for brightness and 5 milliliters of the oil layer was centrifuged in admixture with 5 milliliters of kerosene for a period of one minute and the volume of sediment and water collected was measured. Similar tests were performed utilizing commercially available petroleum oil demulsifiers identified as Examples 3–5. In the following table, the most effective demulsifiers are those which are capable of separating the maximum amount of water from the crude petroleum emulsion leaving a remaining oil layer having the lowest value for sediment and water after centrifuging.

Table

Demulsification of Crude Emulsified Petroleum Oil Samples

| Example | Demulsifier Concentration/ Oil (Volume) | Water Separated From Emulsion % by Volume | Sediment and Water % by Vol. on Centrifuging Oil Layer |
|---|---|---|---|
| | Oil Crude A | | |
| 1 | 1/11,000 | 45 | trace |
| 2 | " | 50 | " |
| 3 | " | 43 | 0.4 |
| | Oil Crude B | | |
| 1 | 1/22,000 | 45 | 0.1 |
| 2 | " | 46 | 0.4 |
| 5 | " | 5 | 0.2 |
| | Oil Crude C | | |
| 2 | 1/11,000 | 58 | 0.2 |
| 4 | " | 47 | 0.8 |
| | Oil Crude D | | |
| 1 | 1/11,000 | 35 | 0.2 |
| 2 | " | 40 | 0.6 |
| 5 | " | 38 | 0.4 |
| | Oil Crude E | | |
| 2 | 1/11,000 | 25 | 0.3 |
| 3 | " | 21 | 0.8 |

The embodiments of the invention in which an exclusive property or privilege is claimed are defined as follows:

1. A polyoxyalkylene compound having the formula:

$$Y[(A)_{\overline{m}}(B)_{\overline{n}}H]_x$$

wherein Y is the residue formed by the removal of x atoms of active hydrogen from an initiator having a total of not more than 20 carbon atoms and free of elements other than carbon, hydrogen and oxygen; A is a hydrophobic, heteric mixture of an oxytetramethylene radical, derived from tetrahydrofuran and at least one of a vicinal alkylene oxide derived from ethylene oxide, propylene oxide, and butylene oxide, said A being derived from the reaction of said oxides in the molar ratio of tetrahydrofuran: vicinal alkylene oxide of 3:1 to 1:1, B is $C_2$ or a mixture of $C_2$ and $C_3$-$C_4$ oxyalkylene radicals derived from ethylene oxide, 1,2-propylene oxide, and vicinal butylene oxide, provided said $C_3$-$C_4$ oxyalkylene radicals are present in a proportion of not more than 50 percent by weight of the total weight of said $C_2$ oxyalkylene radical; x is an integer of one to about five; m is an integer such that the total weight of said A is about 90 to about 10 percent by weight of the total oxyalkylene residue weight of the compound; n is an integer such that the total weight of said B is about 10 to about 90 percent by weight of the total oxyalkylene residue weight of the compound; the total molecular weight of the hydrophobe is about 900 to about 10,000; and the total molecular weight of said polyoxyalkylene compound is about 1000 to about 20,000.

2. The compound of claim 1 wherein said initiator is selected from the group consisting of water, alkylene glycols, polyalkylene glycols, alkanols, phenols, and alkyl phenols.

3. The compound of claim 2 wherein said polyoxyalkylene compound has the formula:

$$Y[(A)_{\overline{m}}(C_2H_4O)_{\overline{n}}H]_x$$

wherein Y, m, n and x have the same values as defined in claim 1 and wherein A is a hydrophobic, heteric mixture of oxyethylene and oxytetramethylene residues derived from the reaction of ethylene oxide and tetrahydrofuran.

4. The compound of claim 3 wherein Y is the residue of at least one $C_2$-$C_8$ alkylene glycol and wherein said oxyethylene and oxytetramethylene residues are in the ratio by weight of 2:1.

5. The compound of claim 4 wherein Y is ethylene glycol.

6. A process for the preparation of the polyoxyalkylene compound of claim 1, said process comprising:
   (a) reacting in a first stage said tetrahydrofuran and at least one of said vicinal alkylene oxides with said Y in the presence of a Lewis acid catalyst until a heteric polyoxyalkylene copolymer product of 900 to about 10,000 molecular weight is obtained and then
   (b) reacting in a second stage said heteric polyoxyalkylene product with ethylene oxide or a mixture of ethylene oxide and 1,2-propylene oxide in the presence of a base catalyst until the total molecular weight of the product is about 1000 to about 20,000.

7. The process of claim 6 wherein said Lewis acid catalyst is selected from the group consisting of boron trifluoride, stannic chloride, and aluminum chloride and said base catalyst is selected from the group consisting of alkali and alkaline earth metal, alkoxides, oxides, and hydroxides thereof.

8. The process of claim 7 wherein said Lewis acid catalyst is boron trifluoride and said base catalyst is potassium hydroxide.

9. A crude petroleum oil composition having separate layers of water and oil comprising a crude petroleum oil, water, and a polyoxyalkylene compound having the formula:

$$Y[-(A)_{\overline{m}}(B)_{\overline{n}}H]_x$$

wherein Y is the residue formed by the removal of x atoms of active hydrogen from an initiator having a total of not more than 20 carbon atoms and free of elements other than carbon, hydrogen and oxygen; A is a hydrophobic, heteric mixture of an oxytetramethylene radical, derived from tetrahydrofuran and at least one of a vicinal alkylene oxide derived from ethylene oxide, propylene oxide, and butylene oxide, said A being derived from the reaction of said oxides in the molar ratio of tetrahydrofuran: vicinal alkylene oxide of 3:1 to 1:1; B is $C_2$ or a mixture of $C_2$ and $C_3$-$C_4$ oxyalkylene radicals derived from ethylene oxide, 1,2-propylene oxide, and vicinal butylene oxide, provided said $C_3$-$C_4$ oxyalkylene radicals are present in a proportion of not more than 50 percent by weight of the total weight of said $C_2$ oxyalkylene radical; x is an integer of one to about five; m is an integer such that the total weight of said A is about 90 to about 10 percent by weight of the total oxyalkylene residue weight of the compound; n is an integer such that the total weight of said B is about 10 to about 90 percent by weight of the total oxyalkylene residue weight of the compound; the total molecular weight of the hydrophobe is about 900 to about 10,000; and the total molecular weight of said polyoxyalkylene compound is about 1000 to about 20,000.

10. The composition of claim 9 wherein said initiator is selected from the group consisting of water, alkylene glycols, polyalkylene glycols, alkanols, phenols, and alkyl phenols.

11. The composition of claim 10 wherein said polyoxyalkylene compound has the formula:

$$Y[(A)_{\overline{m}}(C_2H_4O)_{\overline{n}}-H]_x$$

wherein Y, m, n, and x have the same values as defined in claim 1 and wherein A is a hydrophobic, heteric mixture of oxyethylene and oxytetramethylene residues derived from the reaction of ethylene oxide and tetrahydrofuran.

12. The composition of claim 11 wherein said initiator is ethylene glycol and said oxyethylene and oxytetramethylene residues are in the ratio of 2:1.

13. A batch or continuous process for the demulsification of crude petroleum oil containing about five to about 75 percent water comprising:
    (a) preparing a mixture of said oil, water and a polyoxyalkylene compound by admixing said polyoxyalkylene compound with said water and said crude petroleum oil in the proportion of about 1:5,000 to about 1:50,000 parts by volume of said polyoxyalkylene compound: crude petroleum oil,
    (b) heating said mixture to a temperature of about 100° F. to about 170° F., and
    (c) permitting said mixture of water, crude petroleum oil and said polyoxyalkylene compound to stand in a quiescent state for a period of time of about 5 minutes to about 50 minutes so as to allow the water and oil to stratify
    wherein said polyoxyalkylene compound is the composition of claim 1.

14. The process of claim 13 wherein said initiator is selected from the group consisting of water, alkylene glycols, polyalkylene glycols, alkanols, phenols, and alkyl phenols.

15. The process of claim 14 wherein said polyoxyalkylene compound has the formula:

$$Y[(A)_{\overline{m}}(C_2H_4O)_{\overline{n}}-H]_x$$

wherein Y, m, n and x have the same values as defined in claim 1 and wherein A is a hydrophobic, heteric mixture of oxyethylene and oxytetramethylene residues derived from the reaction of ethylene oxide and tetrahydrofuran.

16. The process of claim 15 wherein said initiator is selected from the group consisting of $C_2$–$C_8$ alkylene glycols.

17. The process of claim 16 wherein said initiator is ethylene glycol and said oxyethylene and oxytetramethylene residues are in the ratio of 2:1.

* * * * *